(No Model.)
J. G. HANNA.
Cotton and Corn Planter.
No. 243,372. Patented June 28, 1881.
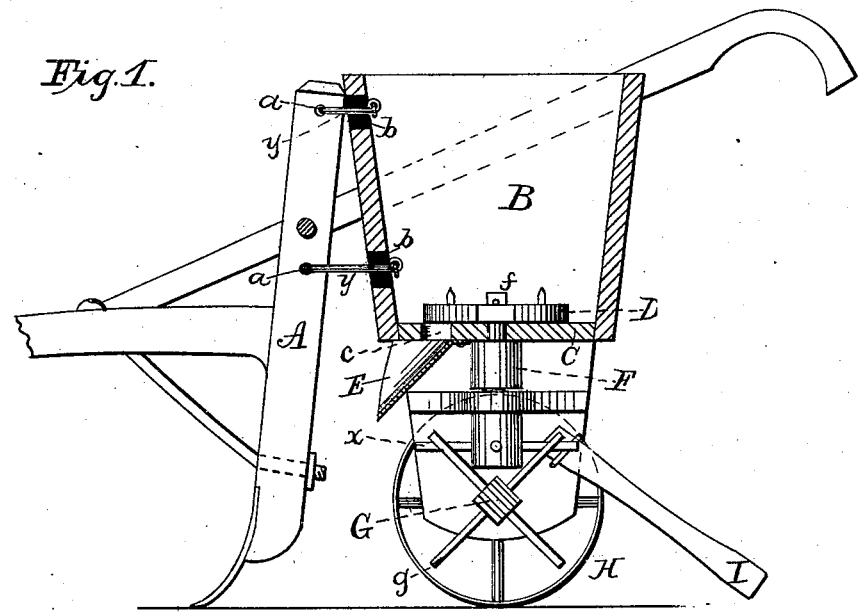
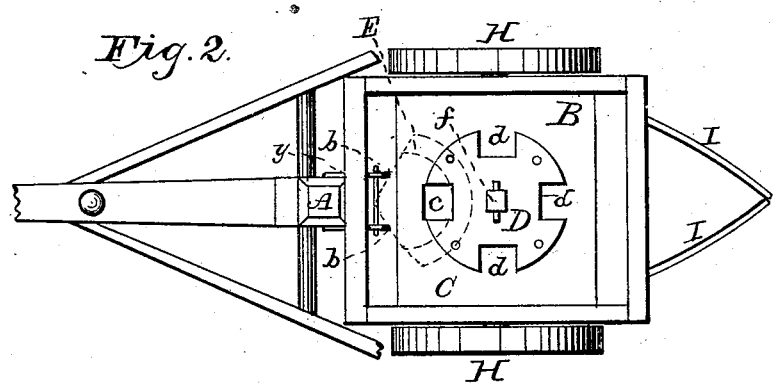
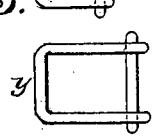
Attest:
F. M. Burnham
H. J. Ennis
Inventor:
J. G. Hanna
By J. S. Duffie
Atty.

UNITED STATES PATENT OFFICE.

JOSEPH G. HANNA, OF LITTLE ROCK, ARKANSAS, ASSIGNOR OF ONE-HALF TO GEORGE W. BOHANAN, OF SAME PLACE.

COTTON AND CORN PLANTER.

SPECIFICATION forming part of Letters Patent No. 243,372, dated June 28, 1881.

Application filed December 8, 1880. (No model.)

*To all whom it may concern:*

Be it known that I, JOSEPH G. HANNA, a citizen of the United States, residing at Little Rock, in the county of Pulaski and State of Arkansas, have invented certain new and useful Improvements in Cotton and Corn Planters; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Figure 1 is a side view of my cotton and corn planter, with one-half of the seed-box and gearing cut away. Fig. 2 is a view of the machine, looking down from the top into the seed-box. Fig. 3 is a detail view of the staples $y\ y$.

My invention relates to that class of planters in which a rotating seed-plate is used; and it consists in having the seed-box so attached to an ordinary plow-stock by means of staple-hinges having their front ends circular in shape and passing through openings in the upright beam of the plow-stock large and loose enough to allow the plow-stock to be turned either to the right or left, thus enabling the plowman to guide it with ease, and so arranged by means of said staple-hinges passing through slots cut perpendicular in the front side of said seed-box and sufficiently long to allow the box to move automatically up or down, and thus accommodate itself to the uneven surface of the ground.

In Fig. 1, A represents an ordinary plow-stock; B, a seed-box. The seed-box is secured to the plow-stock A by means of staple-hinges $y\ y$ passing through openings $a\ a$ in plow-stock A and through slots $b\ b$ in seed-box B. The bottom C of the seed-box B is provided with a small opening, $c$. In the bottom of the seed-box B, and fitting close to the bottom C, is a circular plate, D, provided with a number of notches or recesses, which, when this plate is rotated, register with opening $c$ in bottom C, permitting the seeds to fall through into spout E, which conducts them to the ground and into the furrow made by the plow. The circular plate D is secured to stud $f$ on the upper end of axle F, which passes up through an opening in the center of the bottom C.

$x$ represents a number of radial arms inserted into upright axle F.

G represents an axle provided with an equal number of radial arms, $g$.

H represents wheels that run upon the ground, and are attached at either end of axle G, which revolves with the wheels. When the machine is put in motion the wheels H revolve axle G and the radial arms $g$ engage with the radial arms $x$ and rotate axle F, and the circular plate D, rigidly secured to axle F, as described, is thus rotated for the purposes above described.

I I represent two curved spring-bars, attached by means of hinges to the sides of the seed-box B, to trail upon the ground in the furrow behind the seed-box, and cover up the seeds by throwing up a sharp ridge, which will not have a crust formed over it by being baked in the sun, as ridges do which are made smooth on top by the ordinary modes of covering grain by seed-planters.

I am aware that it is not new to removably attach seeding devices to plows, and such I do not wish to be understood as claiming, broadly; but What I do claim, and desire to secure, is—

In an attachment for plows, the combination of standard A, having holes $a\ a$, links or staples $y\ y$, and hopper B, provided with slots or holes $b\ b$, through which the links project and swivel the hopper, whereby it is capable of a free lateral and vertical movement, substantially as shown and described.

In testimony whereof I have affixed my signature in presence of two witnesses.

JOSEPH G. HANNA.

Witnesses:
W. H. BOOKER,
W. N. PARISH.